(12) United States Patent
Payne et al.

(10) Patent No.: US 8,762,529 B1
(45) Date of Patent: Jun. 24, 2014

(54) HOUSEHOLD REGISTRATION, CUSTOMER RESIDENCY AND IDENTITY VERIFICATION IN A MAIL SERVICE

(71) Applicant: Zumbox, Inc., Los Angeles, CA (US)

(72) Inventors: John M. Payne, Laguna Beach, CA (US); David D. Elkins, Moorpark, CA (US)

(73) Assignee: Zumbox, Inc., Los Angeles, CA (US)

( * ) Notice: Subject to any disclaimer, the term of this patent is extended or adjusted under 35 U.S.C. 154(b) by 0 days.

(21) Appl. No.: 13/912,848

(22) Filed: Jun. 7, 2013

(51) Int. Cl.
| | |
|---|---|
| *G06F 15/16* | (2006.01) |
| *H04L 12/58* | (2006.01) |
| *H04L 29/06* | (2006.01) |
| *H04L 9/32* | (2006.01) |
| *G06F 17/30* | (2006.01) |

(52) U.S. Cl.
CPC .......... *H04L 51/00* (2013.01); *G06F 17/30876* (2013.01); *H04L 63/101* (2013.01); *H04L 9/321* (2013.01); *H04L 63/0853* (2013.01)
USPC ............... 709/225; 709/206; 709/229; 726/4; 726/7

(58) Field of Classification Search
CPC ... H04L 63/08; H04L 63/083; H04L 63/0853; H04L 63/10; H04L 63/101; H04L 63/12; H04L 9/32; H04L 9/3202; H04L 9/321; H04L 9/3213; H04L 9/3226; H04L 61/303; H04L 61/3055; H04L 61/35; G06F 17/30876; G06F 21/62; G06F 21/6272
USPC ................. 709/206–207, 217–219, 225, 229; 726/3–5, 7, 9
See application file for complete search history.

(56) References Cited

U.S. PATENT DOCUMENTS

| | | | | |
|---|---|---|---|---|
| 7,711,950 | B2* | 5/2010 | Orbke et al. | 713/155 |
| 8,572,711 | B1* | 10/2013 | Klau et al. | 726/9 |
| 2002/0152273 | A1* | 10/2002 | Pradhan et al. | 709/206 |
| 2003/0140252 | A1* | 7/2003 | Lafon et al. | 713/201 |
| 2004/0019649 | A1 | 1/2004 | Tanimoto | |
| 2005/0021551 | A1* | 1/2005 | Silva et al. | 707/102 |
| 2007/0271602 | A1* | 11/2007 | Harrison | 726/6 |
| 2008/0066188 | A1* | 3/2008 | Kwak | 726/28 |
| 2008/0120507 | A1* | 5/2008 | Shakkarwar | 713/182 |
| 2010/0145871 | A1 | 6/2010 | Kesem et al. | |
| 2010/0153291 | A1 | 6/2010 | Jimenez et al. | |
| 2012/0266219 | A1* | 10/2012 | Coleman et al. | 726/6 |
| 2013/0013553 | A1* | 1/2013 | Stibel et al. | 707/602 |
| 2013/0036459 | A1 | 2/2013 | Liberman et al. | |
| 2013/0105573 | A1 | 5/2013 | Love et al. | |
| 2013/0152155 | A1* | 6/2013 | Donfried et al. | 726/5 |

* cited by examiner

*Primary Examiner* — Patrice Winder
(74) *Attorney, Agent, or Firm* — David H. Judson

(57) ABSTRACT

A digital postal mail delivery service provides a mail push notification service (MPNS) whereby recipients of sender mailers are invited to join the service in a secure and seamless manner. Preferably, MPNS notifications are provided periodically, continuously, or on demand, and these notifications may be coordinated with other physical or digital mail activities to increase the likelihood of converting new users to the service. The MPNS service takes advantage of publicly-accessible sources of user information to build a registry of potential users who can be matched to information provided by the senders. Upon receipt of a push notification, a customer may register for the service; during that registration, the service verifies the customer's identity and residence in a secure and efficient manner, preferably using the information originally obtained from the sender.

12 Claims, 6 Drawing Sheets

US 8,762,529 B1

HOUSEHOLD REGISTRATION, CUSTOMER RESIDENCY AND IDENTITY VERIFICATION IN A MAIL SERVICE

TECHNICAL FIELD

This disclosure relates generally to digital postal mail services.

BACKGROUND OF THE RELATED ART

Web-based paperless postal systems are known in the art. These systems are designed to connect transactional, financial and government mailers to consumer households for the delivery and storage of digital postal mail via the Internet. The digital postal mail delivered by such systems is an exact facsimile of paper mail created from a redirection of the mailer print stream and, according to one known approach, is delivered to a secure, centralized digital mailbox associated with a recipient's street address. A commercial system of this type is Zumbox®, a hosted service operated and managed by Zumbox, Inc. of Los Angeles, Calif.

Although digital postal mail delivery provides significant advantages, there remains a need to lower the perceived barriers to end user adoption and use of such services.

BRIEF SUMMARY

A digital postal mail delivery service provides a mail push notification service (MPNS) whereby recipients of sender mailers are invited to join the service in a secure and seamless manner. Preferably, MPNS notifications are provided periodically, continuously, or on demand, and these notifications may be coordinated with other physical or digital mail activities to increase the likelihood of converting new users to the service. The MPNS service takes advantage of publicly-accessible sources of user information to build a registry of potential users who can be matched to information provided by the senders. Upon receipt of a push notification, a customer may register for the service; during that registration, the service verifies the customer's identity and residence in a secure and efficient manner, using the information originally obtained from the sender.

According to a feature, a method for verifying identity and current residence information in a digital postal service begins by receiving, from a mail sender, name and physical address information associated with a customer of the mail sender. Upon verifying the name and physical address information received from the mail sender, a data object (e.g., a key or token) that securely associates the name and physical address information with a communication channel (e.g., an e-mail address) associated with the customer is then generated. A message that embeds the data object as a link is then generated and provided to the customer. Then, upon receipt of data indicating that the link has been selected by the customer, the customer is provided with a registration page requesting entry by the customer of the name and physical address information. The existence of the name and physical address information received from the mail sender, however, is not exposed to the customer. Upon receipt of the registration page with customer-entered name and physical address information, a test is performed to determine whether the customer-entered name and physical address information matches the name and physical address information received from the mail sender. Upon such verification (a match), the customer is provided full access to a digital postal mailbox.

The foregoing has outlined some of the more pertinent features of the subject matter. These features should be construed to be merely illustrative.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
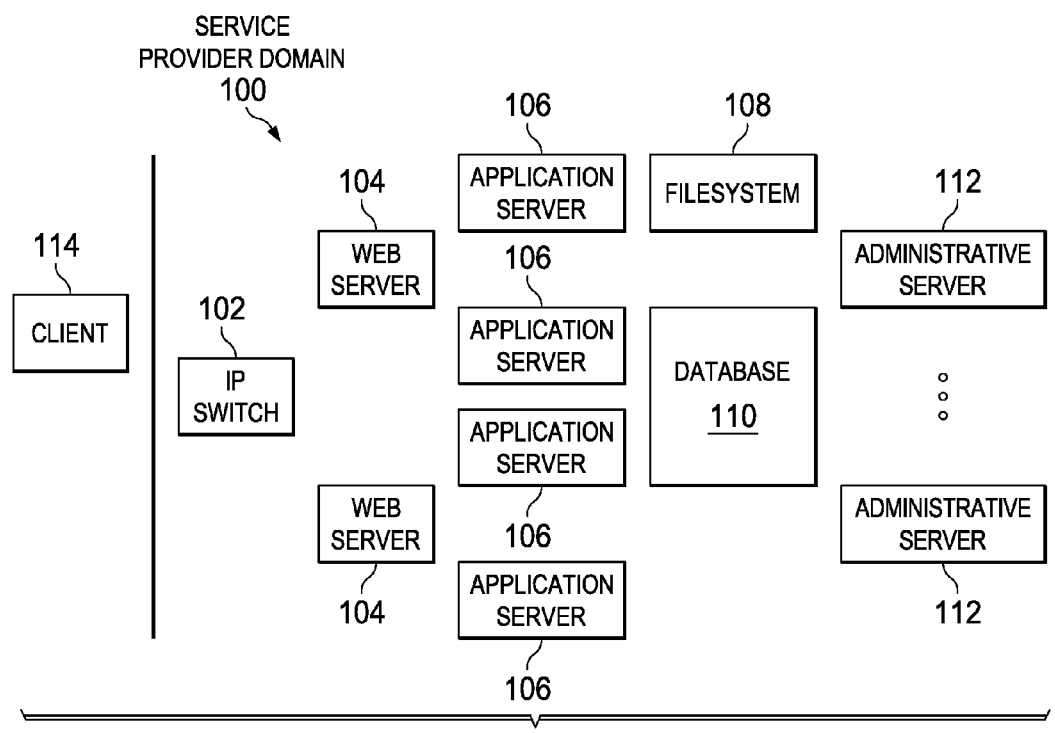
FIG. 1 is an exemplary infrastructure for providing a digital mail service.

FIG. 1 is a block diagram of one system architecture of a digital postal mail service (e.g., a service available from the Internet domain "www.digitalmailservice.com") in which the subject matter described herein may operate. A known digital postal mail service is the Zumbox® paperless postal service. Typically, a digital mail service architecture of this type is implemented in or across one or more Internet accessible data centers as a web site (typically, a set of web pages) together with associated applications running behind the site. End users operate Internet-accessible devices (e.g., desktop computers, notebook computers, Internet-enabled mobile devices, smart phones, gesture-based tablets, or other devices having rendering engines, or the like) that are capable of accessing and interacting with the site. An end user machine typically has a web browser or other rendering engine that is compatible with Java, JavaScript, and other Web 2.0 technologies (e.g., AJAX, XHTML, XML, CSS, DOM, JSON, and the like). An end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). Although connectivity via the publicly-routed Internet is typical, the end user may connect to the system in any manner over any local area, wide area, wireless, wired, private or other dedicated network. As seen in FIG. 1, the "server side" of the system 100 preferably comprises an IP switch 102, a set of web servers 104, a set of application servers 106, a file system 108, a database 110, and one or more administrative servers 112. A representative web server is Apache (2.0 or higher) that executes on a commodity machine (e.g., an Intel-based processor running Linux 2.4.x or higher). The machines may execute on multi-core hardware platforms. An application server typically executes the one or more applications that provide the features of the site. The file system 108 preferably is an application level distributed system that operates across a number of servers using an HTTP or other interface. The database 110 may be implemented using MySQL, or any other convenient database management system. The administrator servers 112 handle other back end processes that are used at the site or otherwise to facilitate the service; these back end processes including, for example, user registration, billing, administration, and interoperability with third party sites and systems as may be required. As also seen in FIG. 1, a client 114 communicates with the system using a web browser, mobile application, or other client-side rendering engine or technology suite.

Figure 2:
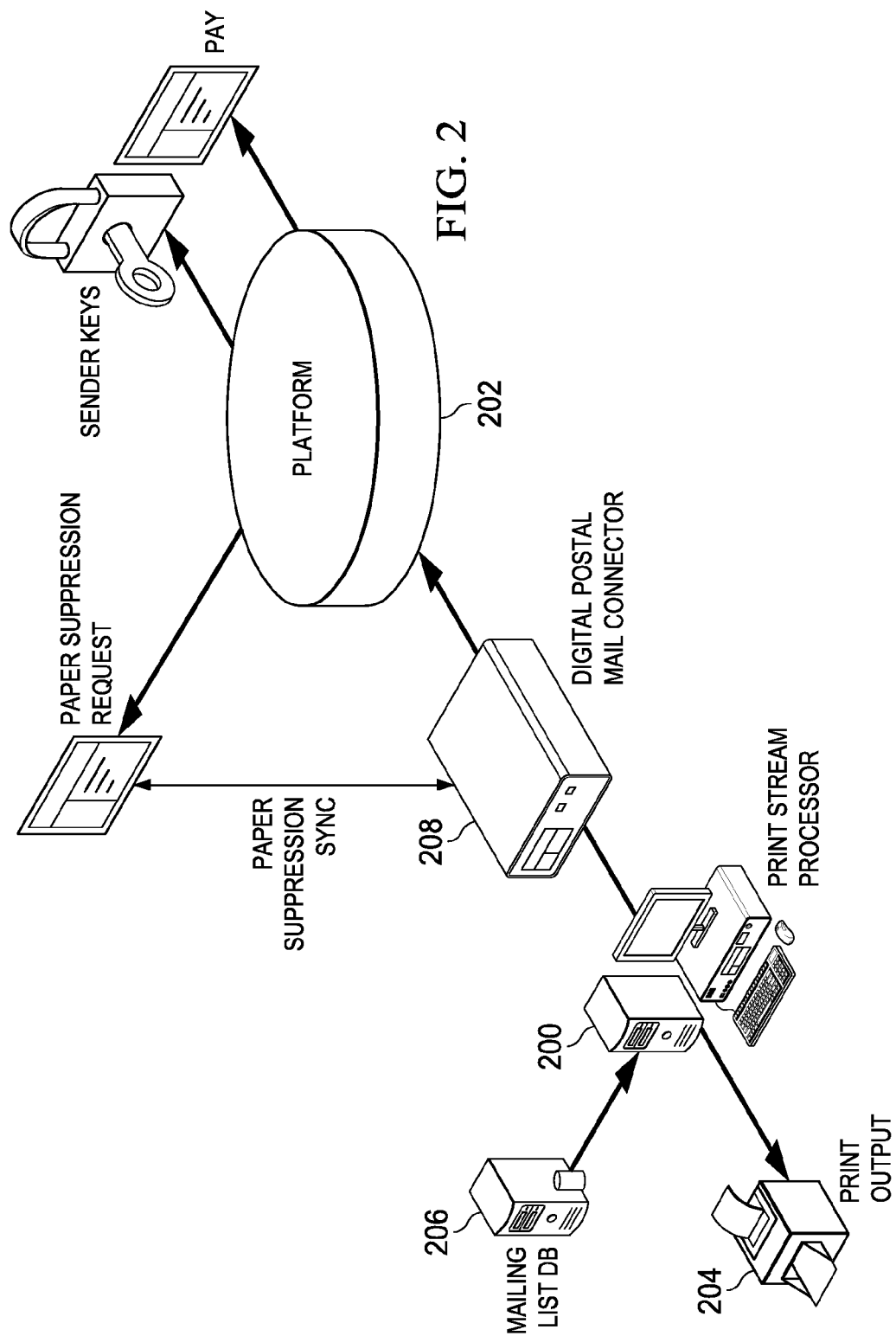
FIG. 2 illustrates how a digital postal mail gateway interfaces to the digital mail service in FIG. 1.

The client 114 in FIG. 1 may be a digital postal mail gateway (DPMG) machine or process. More particularly, and referring now to FIG. 2, preferably the DPMG 208 is positioned between a mailer's print stream processor 200 and the web-based paperless postal delivery platform 202. As seen in FIG. 2, the mailer's print stream processor 200 forms part of the mailer's digital delivery infrastructure. That infrastructure typically also includes at least one printer 204, and a mailing list database 206. There may be other machines, devices, processes, interfaces, databases and resources comprising the mailer infrastructure. Typically, that infrastructure is located at or in association with a mailer facility or facilities, although portions thereof may be hosted in a third party data center (e.g., a cloud compute service provider). The DPMG achieves several goals for in-house production mailers: (a) rapid, low-cost deployment with almost no IT resources required, (b) a highly secure, encrypted channel for digital distribution accessed inside the corporate network rather than "in the wild" over the Internet, and (c) if configured, reports and APIs that provide insight into paper suppression, consumer interactions and other consumer mail response and usage details.

The DPMG is a secure network appliance that automatically and securely delivers (e.g., to consumer households, business entities, and the like) postal mail via a digital channel. Once the gateway is installed and configured, the mailer simply directs its print stream to the installed DPM Gateway, which is typically configured insider the mailer's enterprise firewall and/or DMZ. This configuration allows mailers to achieve paper suppression targets, reduce postage and other mailing related costs, and to improve customer communications. The gateway may be used by any type of mailer, but it provides significant advantages for organizations that send transactional mail to consumer households because it provides direct, secure access to the digital postal network of the paperless postal service provider. In operation, the appliance manages digital delivery with a simple (preferably web-based) interface, without the need for custom IT integration work. Through the digital mail service API, it also delivers detailed reporting about mail recipient usage, including paperless requests, views, payments, printing and discards.

With reference back to FIG. 2, and as has been described, the digital postal mail connector or gateway 208 DPMG preferably is a network appliance that is configured to securely communicate with the web-based postal mail platform 202. Using a simple web-based interface, the mailer entity (e.g., an administrator or other permitted user) configures the appliance with the entity's account information. A web-based wizard enables a simple user interface by which the mailer sets up mailing jobs. A particular job may involve the digital delivery of a mail piece to a plurality of individuals or business entities associated with the mailer. The job is initiated by the user simply dragging and dropping a piece of mail into a "drop folder" (available on a web interface) that has been associated with the network location of the network appliance. Mail is dropped into the folder and delivered via the web-based postal platform.

Preferably, the DPMG is a rack-mounted appliance, although this is not a limitation. The functionality of the gateway may be available as downloadable software (one or more computer programs). An appliance of this type is an Internet-accessible computing machine that comprises commodity hardware and software, storage (e.g., disks, disk arrays, and the like) and memory (RAM, ROM, and the like). The appliance includes hardware, network interfaces and software to connect, on one side, to the mailer's print stream processor and, on the other side, to the Internet and thus to the web-based platform service. The appliance also provides a local management console interface for administration, configuration, and management of the device. The interface between the DPMG and the digital mail platform may be programmatic.

Figure 3:
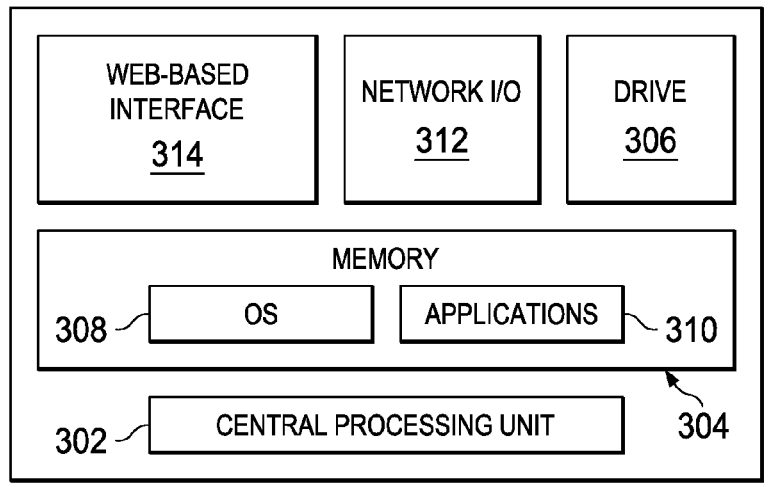
FIG. 3 illustrates the components of a computer system used in the digital postal mail service.

FIG. 3 illustrates a representative computer system used in the digital mail postal system. It includes a CPU 302, computer memory 304 supporting an operating system 308 and one or more applications 310, one or more physical storage drives 306, a network I/O controller 312, and a web-based interface 314.

The digital postal mail service establishes a digital postal mailbox for a particular street address. A person associated with that street address and thus that digital postal mailbox may or may not be a user of the digital postal mail service. As used herein, a person that desires to use the service to receive mail posted by one or more senders can do so without having full access to his or her digital postal mailbox. Thus, for example, a user may provide his or her email address to the service in order to receive sender communications (at that email address). A person that uses the service for this purpose is sometimes referred to herein as an unverified user; a person that registers for the service (and thus access to his or her digital postal mailbox) is sometimes referred to herein as a verified user.

The service provider works with area mailers (e.g., an electric utility, a local retailer, etc.) to deliver statements and other postal mail as digital postal mail. This allows a digital version of an individual's statement (e.g., a monthly bill) to be delivered to a digital mailbox provided to the individual online, assuming the individual requests such delivery. Using the gateway as described above, and at the same time the document is created for printing, the service provider can send the individual a notification by email when it the document is available in the individual digital mailbox.

Mail Push Notification Service (MPNS), and Customer Verification

Figure 4:
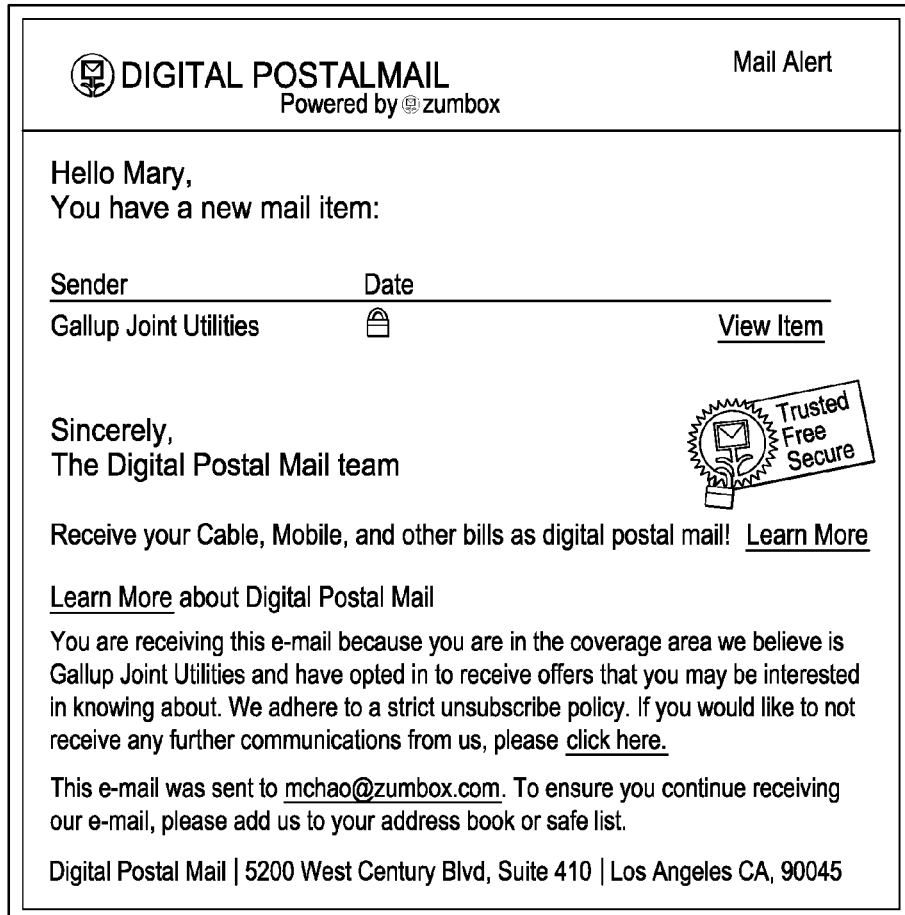
FIG. 4 illustrates a representative MPNS notification.

As just described, once the sender executes a job and sends a mail piece to the digital mail service, the service notifies the sender's customers (end users) that the mail piece is available to be picked up (read). One type of notification is sometimes referred to herein as a "mail push notification" (MPN), and the service of providing such notification is referred to as MPNS. A representative notification of this type is shown in FIG. 4. The notification is delivered to the end user as a web page, a rich (HTML-based) e-mail, or otherwise. In this example, the MPNS notification includes a "Learn More" hyperlink that serves as an invitation for the end user to register for the digital postal mail service (and, in particular, to access his or her digital postal mailbox via the service). As will be described, the hyperlink has associated therewith a verification key (or, more generally, a unique data string or token) that can be used for verification). An end user who is targeted to receive a push notification is sometimes referred to herein as a "matched user." This status is reflected, for example, in the text of the notification message itself, which indicates that the user is receiving the notification because he or she is in a coverage area associated with the sender, and because the user has previously indicated (to the sender) that he or she may have an interest in receiving offers or solicitations.

Figure 5:
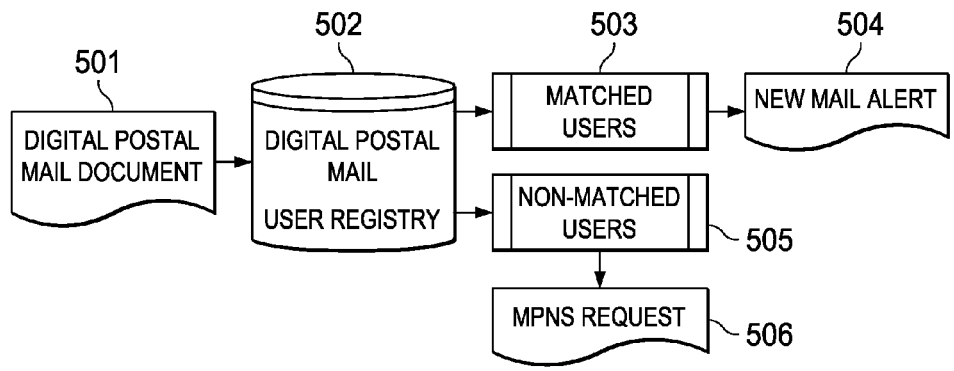
FIG. 5 illustrates the MPNS notification process.

FIG. 5 illustrates the notification process in more detail. In this drawing, the digital postal mail service 502 receives the digital postal mail piece 501 in the manner previously described. The digital postal mail service 502 has an associated user registry that includes data about users of the service. By extracting information in the digital mail piece and comparing that information to the user registry, the service provider can determine whether the particular mail piece is being directed to a matched user 503, or a non-matched user 505. A matched user is not necessarily an individual that is already registered for the digital postal mail service; rather, it is assumed herein that the service provider desires to have the person register for the service. To that end, and as described above, the matched user is provided the mail alert (e.g., FIG. 4), which is an invitation for the recipient to begin use of the service to receive sender bills or other communications.

Figure 6:
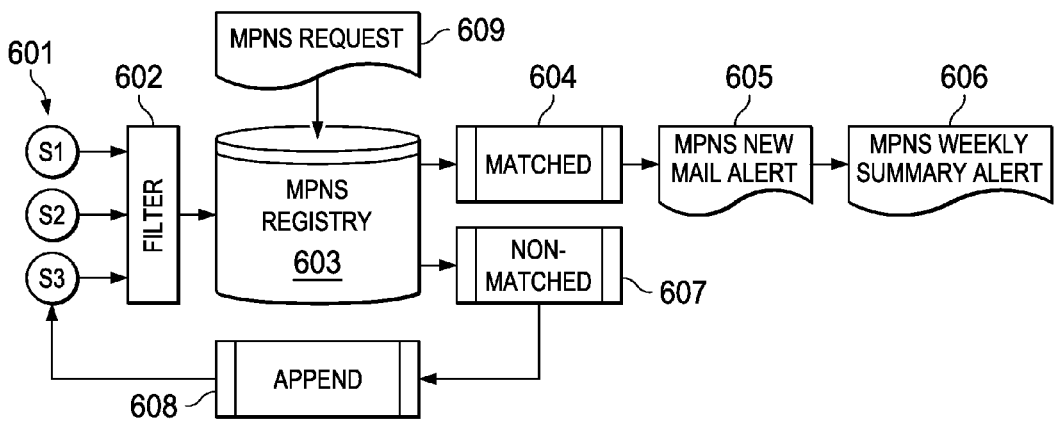
FIG. 6 illustrates an MPNS registry.

As seen in FIG. 6, the digital postal mail service also includes an MPNS registry 603, which is a database that receives information from multiple independent data sources 601 (e.g., sources S1, S2 and S3), which information may be filtered by filter 602 prior to being stored in the MPNS registry. The data sources 601 may be public web sites, publicly-accessible databases/services (e.g., FreshAddress, V12 Group), private databases, and the like. These data sources provide information about users, such as name, address and e-mail tuples, name and address pairs, and the like. The MPNS registry 603 is updated (periodically, continuously or on-demand) with name and address (or other) information of potential end users (typically those customers of senders who use the digital postal mail service and that have opted-in to receive solicitations) that may be offered an opportunity to become registered users of the digital postal mail service. Based on the information in the MPNS registry 603, individuals are then classified either as matched 604 or non-matched 607. For a non-match data entry, the service may append that data to a new request 608 to a data source (e.g., source S3) in an attempt to convert that non-matched data entry to a matched data entry. A matched entry may then receive an MPNS notification 605 about a particular sender communication, as described above (see FIG. 4), a weekly summary alert 606 (that identifies multiple sender communications), or the like.

Referring back to FIG. 5, when the service determines that a particular mail piece is being delivered to a non-matched user 505, the service may then make an MPNS request 506 (FIG. 5). As seen in FIG. 6, this MPNS request 609 is then directed to the MPNS registry.

Referring now to both FIGS. 5-6, mail pieces of interest are delivered by the service (by having senders "drop" those mailers into their respective DPMG appliances. Existing or prospective users that are matched with mailing information (derived from the mailers) are then sent notifications, e.g., based on their profile preferences. Mail that cannot be matched is passed over to the MPNS registry. Then, existing or prospective users that are matched with mailing information (derived from the registry) are then sent notifications, e.g., based on their profile preferences.

Figure 7:
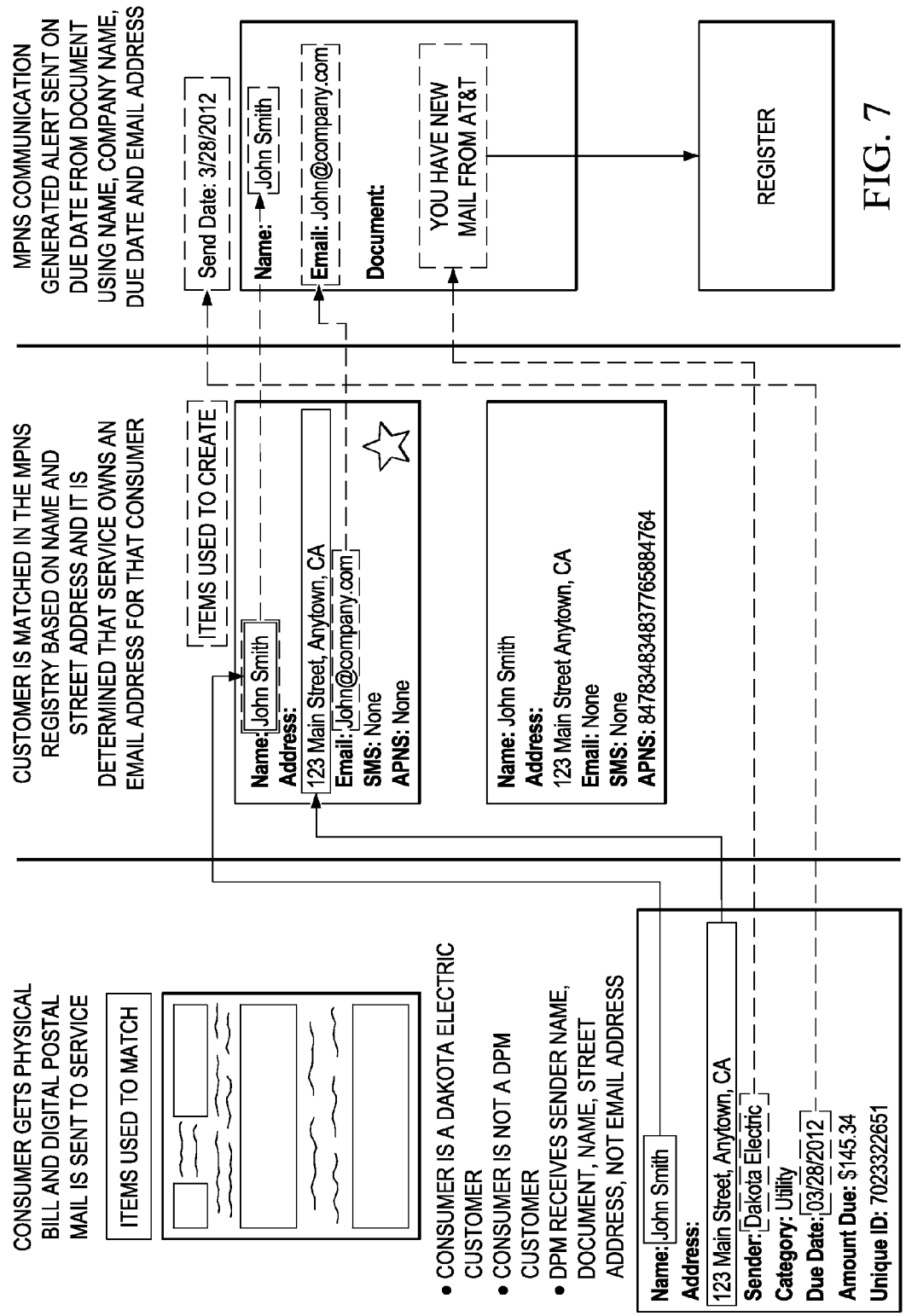
FIG. 7 illustrates a technique by which the service determines whether a user is a matched user.

FIG. 7 illustrates a technique by which the service determines whether a user is a matched user. In the left-most panel, the digital mail piece is scanned to retrieve information from one or more data fields of the mailer. This information includes, for example, name, address, sender, and due date. As seen in the middle panel, the information obtained from the mailer is then attempted to be matched to each of the MPNS registry data entries (two of which are shown). As described above, preferably the information in the MPNS registry is obtained by the service mining information from one or more external data sources (such as shown in FIG. 6). In this example, and based on information obtained in the MPNS registry, there is a name and address match with the first data record; accordingly, the service passes the name and email of the matched user to a notification module, at the same time identifying a communication channel (typically, e-mail) by which the recipient might be reached. The notification module is a software process that is responsible for generating and sending the MPNS notifications. A representative MPNS notification is shown in the right-most panel. In this example, the MPNS notification is sent via the identified communication and on the due date of the original invoice, and the communication includes an invitation for the end user to register for full access to the digital mail postal service (including, among features, access to the individual's digital postal mailbox that has been previously established by the service in association with the user's physical street address).

Figure 8:
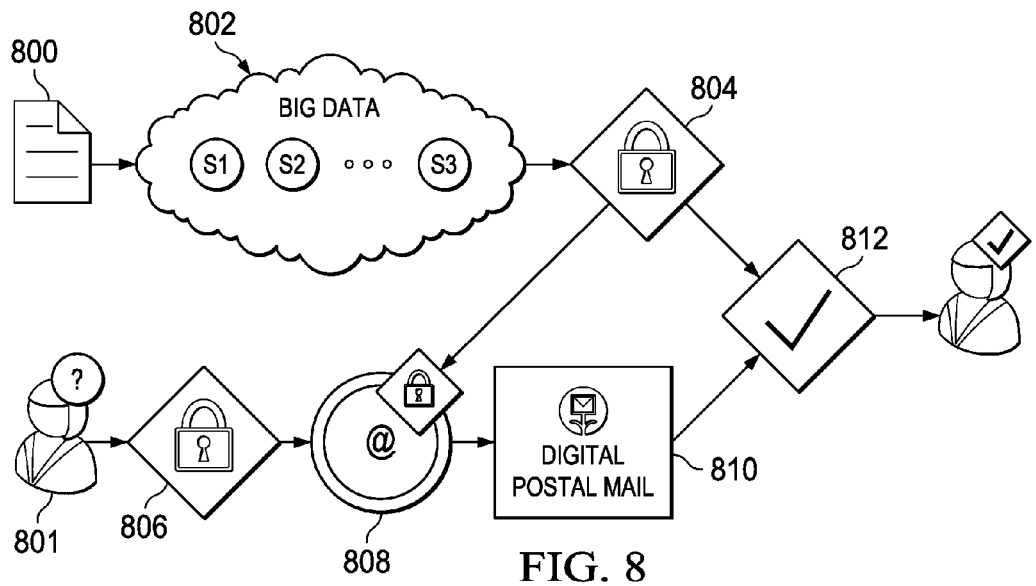
FIG. 8 illustrates a user verification process of this disclosure.

Referring now to FIG. 8, a user verification process according to this disclosure is described. In this scenario, it is assumed that an end user has received an MPNS notification of the type described and desires to begin using the service. The service then verifies the user in the manner illustrated. In particular, steps 800, 802 and 804 correspond to the operations described above. In particular at step 800, the service independently receives name and street address information from its sender customer. That name and street address information is "verified" because the sender has already taken its own steps to ensure the accuracy of that data (or else the sender would not be sending the invoice in the first instance). Further, because the sender is already a registered user of the digital postal mail service, there is an implicit degree of trust that the name and street address information provided by the sender is trustworthy. At step 802, the service independently verifies the name and street address pair information from the one or more data sources (the MPNS registry described above), and it learns of a communication channel (typically e-mail) by which the service can then reach the end user directly. At step 804, the MPNS notification having the verification key embedded therein (e.g., in a hyperlink) is then generated and sent to the (at this point) "unverified" user. Previously, it is assumed that the user 801 has logged into the service at step 806. At step 808, the unverified user views the MPNS message (with the verification key embedded therein) and clicks on the link. In response, the digital postal mail service returns a registration page (an SSL-secured web page) and invites the user to formally register with the service. At step 810, the unverified user completes the registration form by independently entering his or her name and street address and posting that form (e.g., via an HTTPS POST).

As can be seen, there are now two (2) independent sources of the user's name and street address that are present in the system; the mail sender-provided name and street address (obtained through the upper path, namely, steps 800, 802 and 804), and the unverified user-provided name and street address (obtained through the lower path, namely, steps 806, 808 and 810). These disparate data sets, however, are linked to one another with the verification key. To that end, a check is then performed at step 812 to determine whether the data sets match. If a match occurs, the service treats the user as being "verified." A verified user has full access rights with respect to their digital postal mail.

The MPNS approach herein assumes the user is personally identified at least initially by the user logging into an account that originates with the user's e-mail address, wherein that address was independently obtained from the MPNS registry; thereafter, the user is presented with the MPNS notification, which as described provides the user with a token-enabled link that can be selected by the user to facilitate a service registration using actual name and address information to be verified.

The technique described above in FIG. 8 provides significant advantages. A main advantage is that the approach significantly increases the conversion rate of users to the service without necessarily exposing to the customers that the sender has their name and physical address information (that the service received from the mail sender). The registration form (step 810) only requests the user to enter his or her name and street address, and the system verifies that information using the data obtained independently yet otherwise stated to be trustworthy. The end user does not necessarily have knowledge of the information that the system is using to verify the end user's identity and residence, but the end user is assured that the service is operating in a trustworthy manner. This increases the likelihood that an invitee will accept the invitation and become a registered user, especially in the context of the mass invitation that accompanies the sender's billing cycle.

Figure 9:
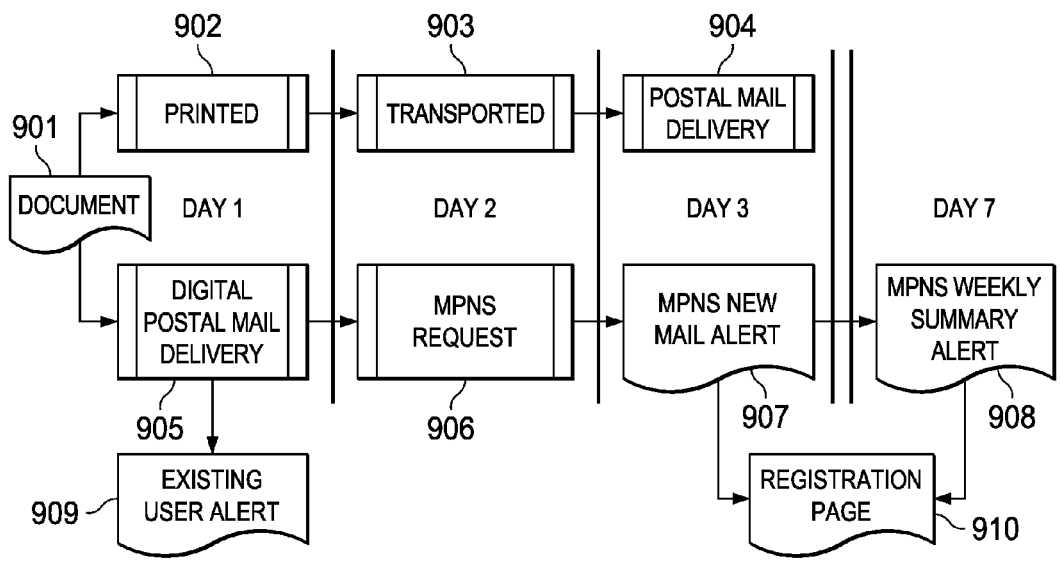
FIG. 9 illustrates an embodiment of an MPNS communication plan.

FIG. 9 illustrates a first embodiment of an MPNS communication plan, with the goal being the formal registration to the service of as many customers of a particular sender. The mailer 901 is posted on a first day. On that day, the mailer is printed (902) and also posted to the digital mail delivery service (905). The existing users of the service are alerted that same day (909). On a second day (presumably the next day, but this is not a requirement), the physical mail is transported (903) in the conventional manner. On that same day, an MPNS request (906) is delivered (because it is assumed that the target user is not matched. On the next day, the physical mail piece is delivered to the recipient (904). At the same time, an MPNS new mail alert (907) is delivered to the user, who by this time has been matched by the service. In the alternative, an MPNS weekly alert (908) is sent to the user. In either case, the alert causes the user to request the registration page 910 and the user is registered to the service in the manner described.

The service provider may deliver the MPNS notifications according to other communication plans. Thus, a certain percentage of sender customers may be slated to receive the notifications at given points during a sender billing cycle, with new mail notifications sent to coincide with physical mail delivery (as described above), with non-responders then getting weekly summary notifications, or the like. A similar process may then be repeated over a next billing cycle.

Without meant to be limiting, the MPNS functionality herein may be implemented as an adjunct to any postal service having a registry that provides a linkage between street address and electronic identity. As has been described, preferably the registry compiles data from numerous data sources that are opt-in and fully permissioned. A digital postal mail (DPM) registry provides a way to reach non-digital consumers and thus potentially convert them to digital relationships, thus obviating paper/postage-based delivery and increasing the sender's paper suppression rates. Such opt-in data sources include verified digital mailbox users on the digital postal mail system, any e-mails or other electronic addresses provided (e.g., in a mail file header) by the mailer for their consumer households, contact addresses from opt-in third party data service providers (e.g., Experian and others), and contact addresses from a broader mailer network. As described herein, a DPM registry may be augmented to include a service for delivering alerts and notifications for verified and unverified households (or other target recipients) when new mail is available for them. The same notification system can be used for verified or new, unverified households. Preferably, the mail push notification system has multiple communication channels (e.g., e-mail, desktop alerts, social media, mobile SMS, and the like). Thus, one way to characterize MPNS is as a service of the DPM registry provided to the sender that notifies consumer households when digital mail is available for them. Preferably, the service uses only opt-in, verified electronic addresses from the individual mailer, the DPM registry and third party data service providers.

Once verified through the technique herein, the user is registered to the service and the process need not be repeated.

More generally, the techniques described herein are provided using a set of one or more computing-related entities (systems, machines, processes, programs, libraries, functions, or the like) that together facilitate or provide the described functionality described. In a typical implementation, the gateway comprises one or more computers. A representative machine comprises commodity hardware, an operating system, an application runtime environment, and a set of applications or processes and associated data, that provide the functionality of a given system or subsystem. As described, the functionality may be implemented in a standalone node, or across a distributed set of machines. If the mailer print stream processor is cloud-based, the DPMG may be offered as a SaaS solution. The DPMG also may be implemented as platform-as-a-service (PaaS) or infrastructure-as-a-service (IaaS).

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows.

The invention claimed is:

1. A method for verifying identity and current residence information in a web-based service, comprising:

receiving, from a sender, name and physical address information associated with a customer of the sender;

upon verifying the name and physical address information received from the sender, generating a data object that securely associates the name and physical address information with a communication channel associated with the customer;

generating a message that includes a Uniform Resource Locator (URL) having the data object embedded therein;

upon receipt of data indicating selection of the URL by the customer, the data including the data object, providing the customer with a registration page requesting entry by the customer of the name and physical address information, wherein the existence of the name and physical address information received from the sender is not exposed to the customer;

upon subsequent receipt of the registration page with customer-entered name and physical address information, using the data object to link the customer-entered name and physical address information from the registration page to the name and physical address information received from the sender;

verifying, using software executing in a hardware element, that the customer-entered name and physical address information from the registration page matches the name and physical address information received from the sender; and upon verification, enabling the customer to access a content repository.

2. The method as described in claim 1 wherein the name and physical address information received from the sender is verified against a publicly-accessible data service.

3. The method as described in claim 2 wherein the e-mail address associated with the customer is received from the publicly-accessible data service.

4. The method as described in claim 1 wherein the data object is a security token.

5. The method as described in claim 1 wherein the message is a web-based message that includes an invitation for the customer to become a registered user of the web-based service.

6. The method as described in claim 1 wherein the digital postal mailbox is uniquely associated with the customer and the customer's physical address.

7. The method as described in claim 1 wherein the communication channel is an e-mail address.

8. The method as described in claim 1 further including forwarding the message to an email account associated with the customer.

9. The method as described in claim 1 wherein the service is a digital postal mail service.

10. Apparatus to provide a digital postal mail system, comprising:

a network-accessible infrastructure operating at a service provider domain, the network-accessible infrastructure comprising hardware and at one web server, an application server, and a database;

the web server operative to enable access to secured digital mailboxes by individual that are registered on the digital postal mail system;

a data registry supported in the database, the data registry providing a linkage between an individual's street address and electronic identity, wherein the registry compiles data from at least one or more data sources; and a notification service associated with the data registry to provide notifications when digital mail is available, wherein the notification service includes program code, the program code operative to:

receive, from a mail sender, name and physical address information associated with a customer of the mail sender;

upon verifying the name and physical address information received from the mail sender, generate a data object that securely associates the name and physical address information with a communication channel associated with the customer;

generate a message that includes a Uniform Resource Locator (URL) having the data object embedded therein;

upon receipt of data indicating selection of the URL by the customer, the data including the data object, provide the customer with a registration page requesting entry by the customer of the name and physical address information, wherein the existence of the name and physical address information received from the mail sender is not exposed to the customer;

upon subsequent receipt of the registration page with customer-entered name and physical address information, using the data object to link the customer-entered name and physical address information from the registration page to the name and physical address information received from the mail sender;

verify that the customer-entered name and physical address information from the registration page matches the name and physical address information received from the mail sender; and upon verification, enable the customer to access at least some contents of a digital postal mailbox.

11. The apparatus as described in claim 10 wherein the at least one or more data sources are one of: verified digital mailbox users on the digital postal mail system, e-mails or other electronic addresses provided by a sender, contact addresses obtained from opt-in third party data service providers, and contact addresses obtained from some other mailer network.

12. The apparatus as described in claim 10 wherein the notifications are delivered by a communication channel that is one of: e-mail, web-based alerts, social media, mobile text messaging, and other push notification services.

* * * * *